United States Patent [19]
King et al.

[11] Patent Number: 5,639,408
[45] Date of Patent: Jun. 17, 1997

[54] METHOD AND APPARATUS FOR FORMING PLASTIC TUBE WITH SPIRAL INLAYED EXTERIOR DESIGN

[75] Inventors: Jon E. King, St. Louis; Phillip M. Brewer, Fenton; Bradley G. Stack, St. Louis, all of Mo.

[73] Assignee: Sinclair & Rush, Inc., St. Louis, Mo.

[21] Appl. No.: 447,343

[22] Filed: May 23, 1995

Related U.S. Application Data

[63] Continuation-in-part of Ser. No. 362,846, Dec. 22, 1994, Pat. No. 5,536,461.
[51] Int. Cl.$^6$ .............................. B29C 47/04; B29C 53/14
[52] U.S. Cl. ............... 264/103; 264/171.29; 264/173.18; 264/177.17; 264/209.8; 425/133.1; 425/391; 425/462
[58] Field of Search ................ 264/171.29, 173.18, 264/103, 281, 209.3, 209.8, 177.17; 425/133.1, 462, 391

[56] References Cited

U.S. PATENT DOCUMENTS

| | | | |
|---|---|---|---|
| 2,291,238 | 7/1942 | Kimmick | 264/171.29 |
| 3,334,168 | 8/1967 | Majewski et al. | 264/209.8 |
| 3,441,637 | 4/1969 | Davis | 264/564 |
| 3,520,963 | 7/1970 | Allseits et al. | 264/209.4 |
| 4,113,814 | 9/1978 | Kojimoto et al. | 264/167 |
| 4,117,064 | 9/1978 | Mathe et al. | 425/391 |
| 4,548,567 | 10/1985 | Missout | 425/113 |
| 4,655,987 | 4/1987 | Zertuche | 264/209.8 |
| 4,836,968 | 6/1989 | Cakmakei | 264/209.3 |
| 4,998,870 | 3/1991 | Seibert | 264/245 |
| 5,059,057 | 10/1991 | Graef | 403/298 |
| 5,536,461 | 7/1996 | King et al. | 264/209.8 |

FOREIGN PATENT DOCUMENTS

| | | | |
|---|---|---|---|
| 56-19732 | 2/1981 | Japan | 264/209.8 |
| 60-104308 | 6/1985 | Japan | 264/173.18 |
| 4-14425 | 1/1992 | Japan | 264/209.8 |
| 997212 | 7/1965 | United Kingdom | 264/173.18 |

*Primary Examiner*—Jeffery R. Thurlow
*Attorney, Agent, or Firm*—Polster, Lieder, Woodruff & Lucchesi, L.C.

[57] ABSTRACT

A one-piece tube multi-pack and its method of manufacture are disclosed. The one-piece tube multi-pack includes an elongated thin-walled tubular element made of transparent flexible plastic material with inner and outer peripherally extending walls. At least one thin-walled web section is integrally connected to the inner peripheral extending wall of the tubular element and has greater flexibility than the tubular element in order to adjustably accommodate a plurality of separate discrete products positioned on opposite sides of the at least one integral web section. The at least one integral thin-walled web section may be connected to the inner peripherally extending wall of the tubular element at different relative locations, for example, in a spiral or curvilinear or other shaped path throughout the tubular element. The method for making the one-piece tube multi-pack includes the extrusion of the elongated thin-walled tubular element and the at least one thin-walled web section with greater flexibility than the tubular element. When formed to extend at different relative locations throughout the tubular element, such as a spiral or curvilinear or other shaped path, the tubular element is twisted while in a heated state to form the shape throughout the tubular element. The tubular element can be forced having a pair of channels formed in the outer peripherally extending wall with spirally extending ribbons of non-transparent material co-extruded and inlayed in the channels.

14 Claims, 4 Drawing Sheets

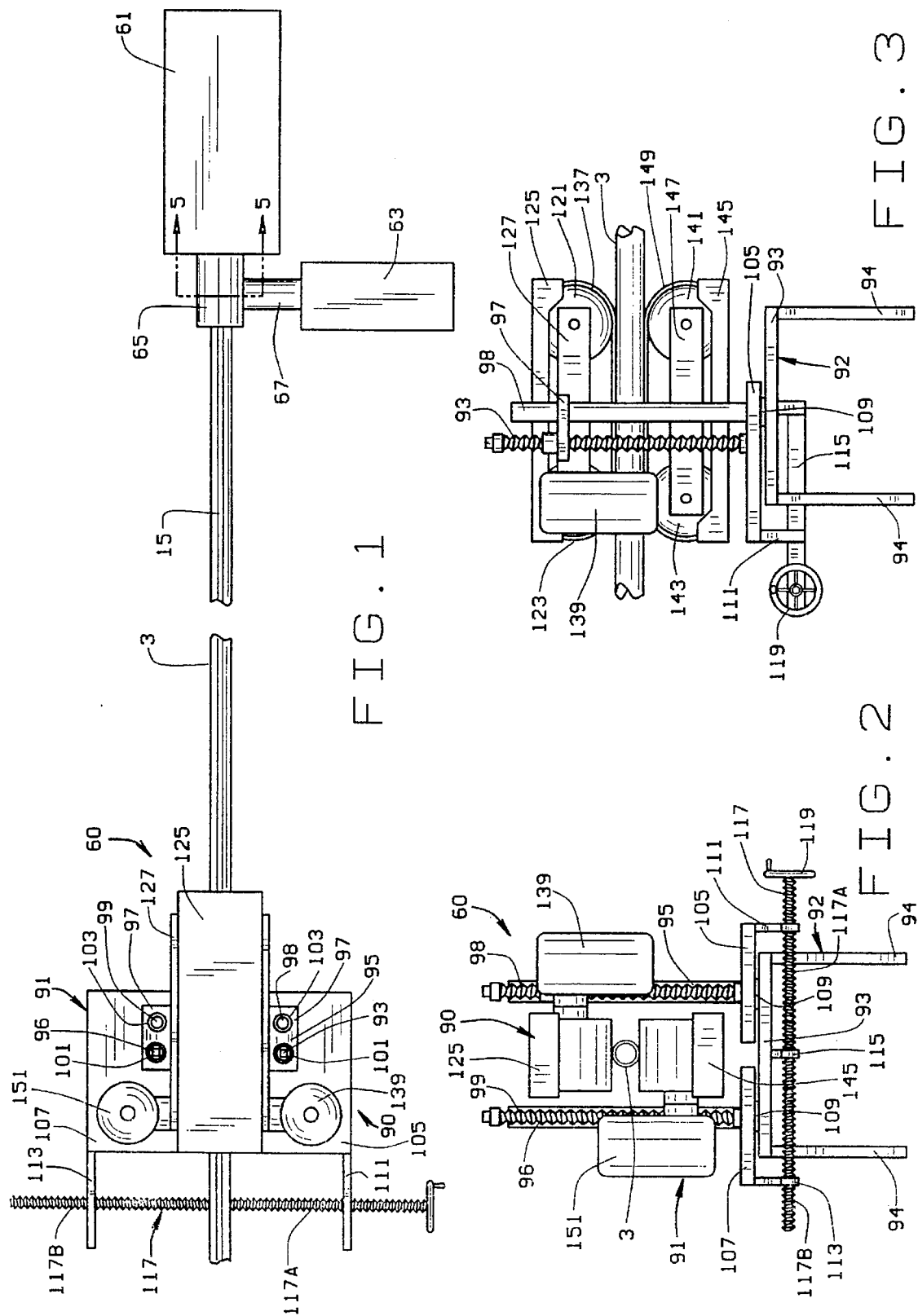

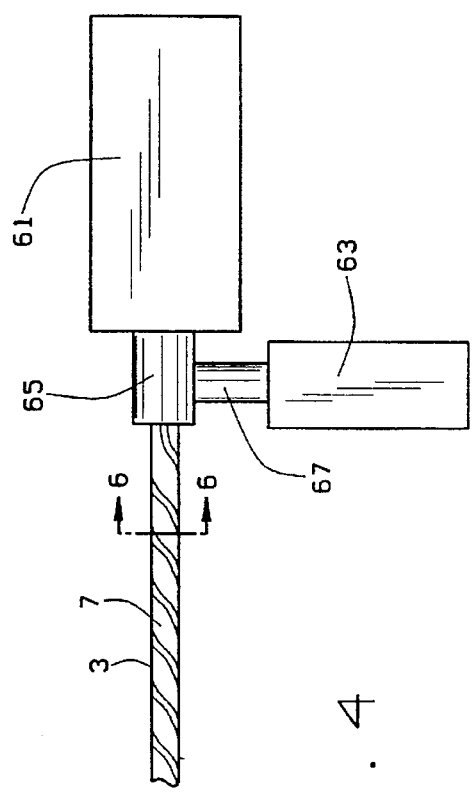
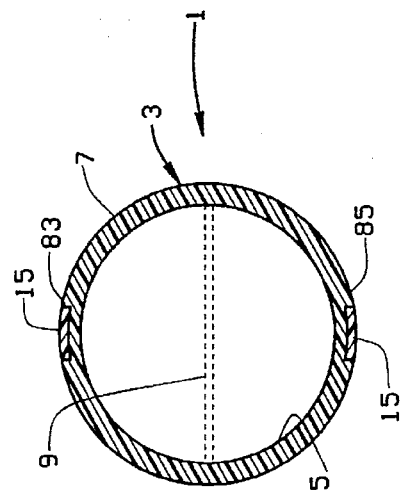
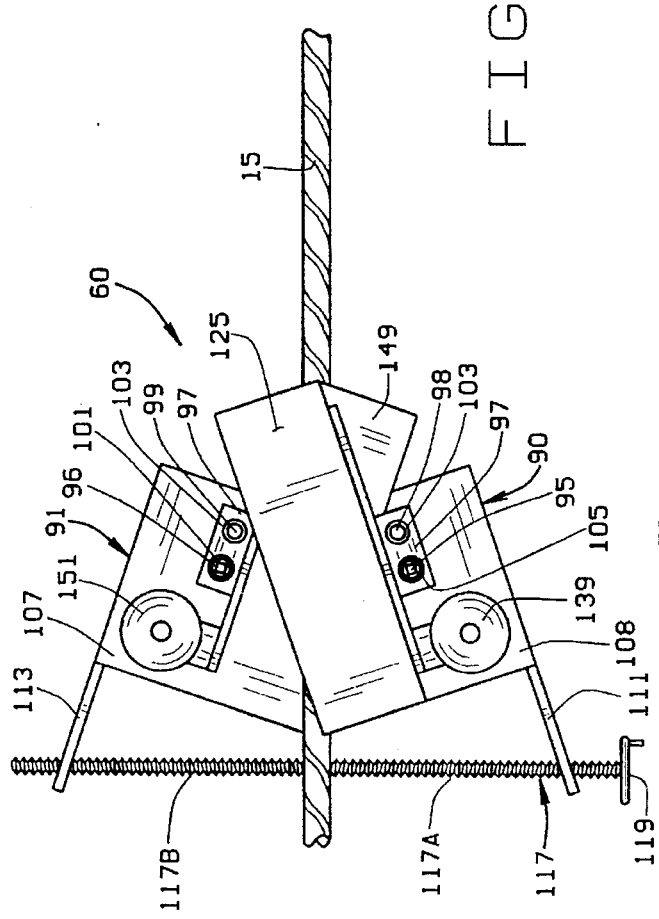

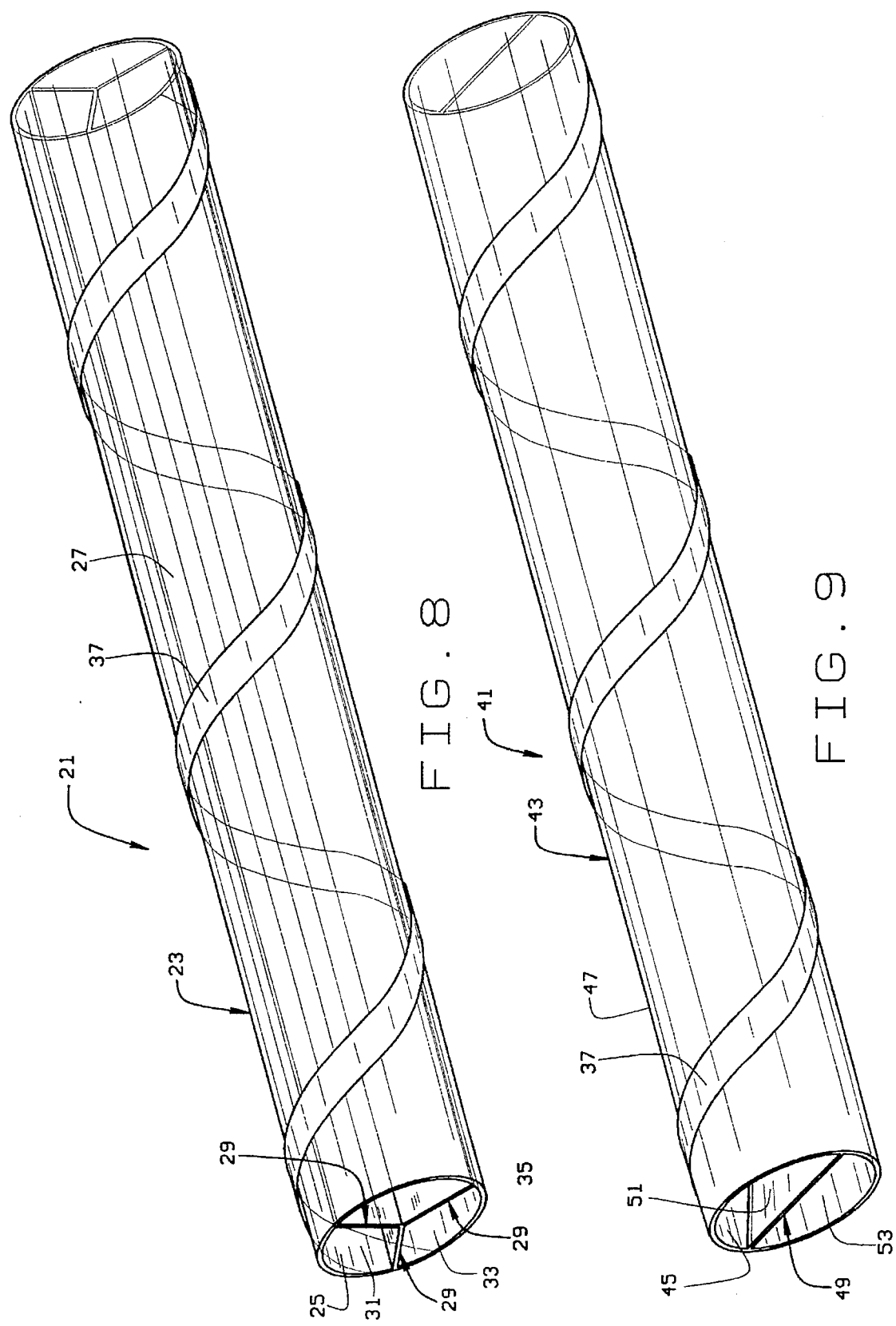

METHOD AND APPARATUS FOR FORMING PLASTIC TUBE WITH SPIRAL INLAYED EXTERIOR DESIGN

This application is a continuation-in-part of application Ser. No. 08/362,846, filed Dec. 22, 1994, entitled TUBE MULTI-PACKS AND METHODS OF MANUFACTURING, now U.S. Pat. No. 5,536,461, issued Jul. 16, 1996.

BACKGROUND OF THE INVENTION

The present invention relates to a new and improved method and apparatus for forming integral spiral exterior ribbons along one-piece tube and/or tube multi-packs.

In the aforementioned parent patent application, a one-piece plastic tube is formed with separate compartments or passageways in order to accommodate descrete products or components in such compartments or passageways. In addition to providing separate compartments or passageways for the discrete products or components, the packaging tube must also be attractive and aesthetically pleasing. This has been achieved through a number of different modified shapes and designs in the one-piece plastic packaging tube. This has included compartments in a one-piece plastic tube with or without a separately attached spirally wound ribbon. In those cases where a spirally wound ribbon is not separately attached to the outer surface of the one-piece plastic tube, the tube can be formed with compartments such that when the tube is twisted, the compartments are formed in a spiral configuration throughout the length of the tube.

The present invention differs from the above designs and method of manufacture in that the one-piece plastic packaging tube has an integral inlayed spiral design provided on the external surface of the tube to create a "candy-cane" type image for aesthetic or marketing purposes. The integral inlayed spiral design formed on the exterior surface of the one-piece plastic tube is formed by the novel and unique method and apparatus which will be discussed in further detail below.

SUMMARY OF THE INVENTION

Among the several objects and advantages of the present invention is the provision of a new and improved one-piece tube multi-pack including an elongated thin-walled tubular element and one or more integral inlayed spiral ribbons or designs provided on the exterior surface of the elongated thin-walled tubular element;

The provision of a new and improved apparatus for manufacturing the thin-walled tubular element with one or more spirally extending non-transparent ribbons inlayed on the exterior surface of the tubular element;

The provision of a new and improved method for manufacturing the thin-walled tubular element with one or more spirally extending non-transparent ribbons inlayed on the exterior surface of the tubular element.

Briefly stated, the one-piece tube multi-pack of the present invention includes an elongated thin-walled tubular element made of transparent flexible plastic material having inner and outer peripherally extending walls. At least one spirally extending integral ribbon is inlayed on the outer peripherally extending wall of the tubular element.

At least one integral thin-walled web section formed with greater flexibility than the tubular element may also be formed within the tube in order to adjustably accommodate a plurality of separate discrete products positioned on opposite sides of the at least one integral thin-walled web section. The at least one integral web section may have the same or a lesser thickness than the tubular element. The one-piece tube multi-pack may include a plurality of thin-walled web sections interconnected to one another at one end and interconnected to the inner peripherally extending wall of the tubular element at an opposite end. In certain instances, there may be three equally spaced thin-walled web sections.

The method for manufacturing the elongated thin-walled tubular element includes the extrusion of an elongated thin-walled tubular element having a channel formed in the outer peripherally extending tubular wall and the simultaneous extrusion of a non-transparent ribbon into the channel, the tubular element being twisted while in a heated state for forming a spirally extending non-transparent ribbon inlayed on the outer peripherally extending wall of the tubular element.

The apparatus for manufacturing the elongated thin-walled tubular element including at least one spirally extending non-transparent ribbon inlayed on the outer peripherally extending wall of the tubular element is accomplished through the use of a pair of opposed motor driven belts that engage the extruded thin-walled tubular element and twist the tubular element as it exits the extruder to create the desired number of turns of the spirally extending ribbon on the outer peripherally extending wall of the tubular element.

These and other objects and advantages of the invention will become apparent from the description that follows.

BRIEF DESCRIPTION OF THE DRAWINGS

In the drawings, FIG. 1 is a top plan view of the method employed and apparatus used for making an elongated thin-walled tubular element having an inlayed spirally extending non-transparent ribbon on the outer peripherally extending tubular wall;

FIG. 2 is an end elevational view of the method and apparatus shown in FIG. 1;

FIG. 3 is a side elevational view of the dual motor driven friction belt assembly of the apparatus shown in FIG. 1;

FIG. 4 is another top plan of the apparatus shown in FIG. 1;

FIG. 5 is a partial cross-sectional view of the extruder portion of the apparatus taken along lines 5—5 of FIG. 1;

FIG. 6 is a cross-sectional view of an elongated thin-walled tubular element having two spirally extending non-transparent ribbon inlayed on the outer peripherally extending wall of the tubular element;

FIG. 8 is a perspective view of a tubular element with separate integral compartments and an integral spirally wound ribbon inlayed on the outer peripherally extending wall; and FIG. 9 is a perspective view of a tubular element with spiral compartments and an integral spirally wound ribbon inlayed on the outer peripherally extending wall of the tubular element.

Corresponding reference numerals will be used throughout the several figures of the drawings.

DESCRIPTION OF THE PREFERRED EMBODIMENTS

Figure 7:
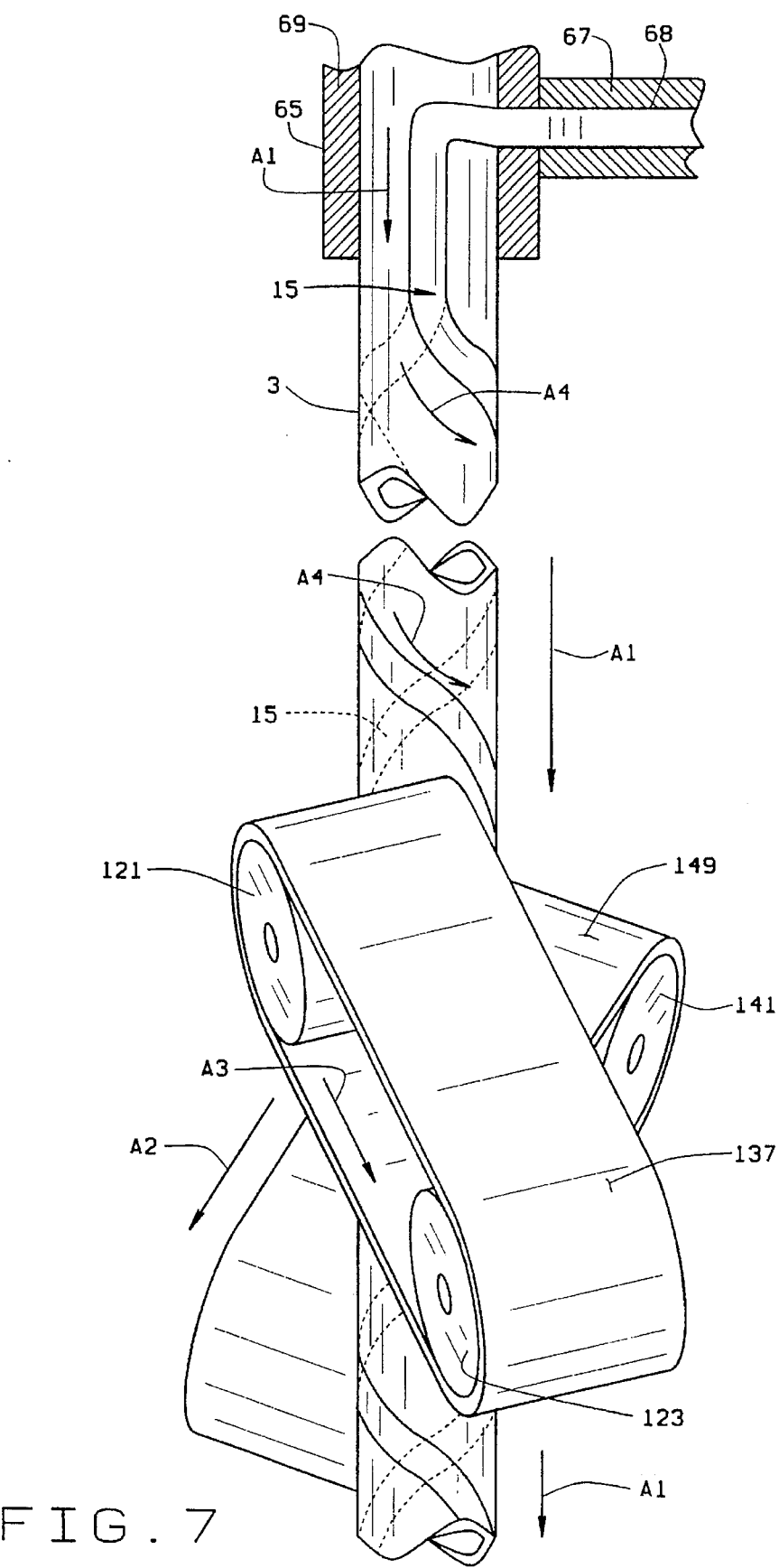
FIG. 7 is a partial top plan view of the method and apparatus shown in FIG. 1 which is partially cut away in order to illustrate the method of manufacturing the two inlayed spirally wound ribbons on the outer peripherally extending wall of the tubular element.

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

The one-piece tubular element formed by the method and apparatus of the present invention includes a tubular element with at least one spiral ribbon of material inlayed in the tubular element as shown in FIGS. 1–7, a tubular element having at least one web section within the tube and at least one integral spiral ribbon of material on the exterior of the tube as shown in FIG. 8, and a tubular element having at least one spirally extending web section within the tube and at least one integral spiral ribbon of material on the exterior of the tube as shown in FIG. 9.

In each of the various embodiments of the one-piece tube disclosed, it will be seen that the one-piece tube, as shown in FIG. 6, includes an elongated thin-walled tubular element 3 made of transparent flexible plastic material having inner and outer peripherally extending wall 5, 7, respectively. An integral thin-walled web section 9, shown in dotted lines, is also made of transparent flexible plastic material and may be integrally connected at opposite ends to the inner peripherally extending wall 5 of the tubular element 3. A further discussion of a tubular element 3 formed in one or more planar or spiral web sections will be further discussed in connection with FIGS. 8–9 below.

The apparatus for manufacturing a thin-walled tubular element 3 is indicated generally by reference numeral 60 in FIGS. 1–7 of the drawings. In addition, the method of forming a tubular element 3 with a spirally extending non-transparent ribbon, such as ribbon 15 inlayed on an outer peripherally extending wall 7, as shown in FIGS. 4–6, will also be described in connection with FIGS. 1–7.

Apparatus 60 has a first conventional extruder 61 and a second extruder or co-extruder 63 positioned generally at a right angle to the first extruder 61. The first extruder 61 has an extrusion die 65 through a tube 67. Tube 67 has an axial bore 68 through which the ribbon material flows as will be explained below.

The die 65 is shown in greater detail in FIG. 5. Die 65 has an outer cylindrical body 69 defining an axial bore 70 having an internal wall 71. A cylindrical plug 72 is centrally positioned within bore 70 in order to provide a gap or space 73 between wall 70 and plug 72. It will be appreciated that space 73 is quite small. For example, the distance between plug 72 and wall 70 is preferably approximately 0.0012 inches (12 mil). Internal wall 71 has a first channel insert 74 and a diametrically opposed second channel insert 75. It will be appreciated that channel inserts 74 and 75 protrude into space 73 preferably a distance of approximately 0.0004 inches (4 mil). Cylindrical body 69 has a side port 76 which opens into an internal cavity 77. Port 76 is in fluid communication with bore 68 in tube 67 that is connected to the co-extruder 63. The internal cavity 77 extends through only one side of cylindrical body 69. The internal cavity 77 has a first opening 79 located in insert 74 which is in fluid communication with space 73 and a second opening 81 located in insert 75 which also is in fluid communication with space 73. The size of the respective openings 79 and 81 form first and second channels 83, 85 such that a ribbon of material (preferably non-transparent) approximately 0.006 inches (6 mil) in thickness and approximately as wide as the openings 79, 81 can flow into each such opening.

From the description of the extruder 61 and co-extruder 63 constructions, it will be appreciated that two ribbons 15 are inlayed into peripherally extending wall 7 of the thin-walled tubular element 3 as tube 3 is pulled through the die 65. The tube 3 is extruded through the space 73 in die 65 in a conventional manner. However, channel inserts 75 and 75 reduce the wall thickness at those points, creating a pair of opposed channels 83 and 85 in wall 7. As stated above, the space or gap 73 is, for example, 0.0012 inches (12 mil). Therefore, the tube 3 will have a material thickness of 12 mil except at channels 83 and 85. Because inserts 74 and 75 are, for example, 0.004 inches (4 mil), channels 83 and 85 will be 4 mil deep and the wall thickness at the inserts will be 0.008 inches. A ribbon of material, preferably non-transparent, approximately, for example, 0.006 inches (6 mil) thick flows through openings 79 and 81 and will be laid down in channels 83 and 85. It will be appreciated that extruder die 65 could have only one insert, for example insert 74, which would result in a tube 3 having one ribbon 15 of non-transparent material.

Although 6 mil of material is extruded into each of the 4 mil in depth channels 83 or 85, the space or gap 73 in the extruder die 65 will maintain the outer peripheral wall 7 with the same outer dimension even in the area of the ribbons 15, 15. Thus, any excess material will be urged inwardly within the tube 3 along the inner wall 5.

FIGS. 1–3 and 7 illustrate the elements of apparatus 60 that create the spirally extending ribbons 15, 15. Apparatus 60 has a pair of motor driven continuous belt assemblies 90 and 91 mounted on a support frame 92. The support frame and the mounting arrangement of the belt assemblies 90 and 91 will now be described in detail.

Frame 92 has a horizontal platform 93 and four support legs 94. Belt assemblies 90 and 91 are attached to vertical threaded screw jacks 95 and 96, respectively, by a side bracket 97 which extends laterally from each belt assembly. One side bracket 97 connects screw jack 95 to a vertical support pole 98 and another side bracket 97 connects screw jack 96 to vertical support pole 99. Each bracket 97 has a threaded hole 101 to accommodate the threaded engagement of the screw jacks 95 or 96 and an oversized hole 103 to accommodate the upright support pole. The screw jack and support pole arrangements allow the belt assemblies 90 and 91 to be appropriately positioned relative to each other and relative to the tube 3 (FIG. 20) that is engaged therebetween. Screw jacks 95 and 96, as well as support poles 98 and 99, are mounted to horizontal bases 105 and 107, respectively.

Base 105 is pivotally attached to the bottom end of support pole 98 in the following manner. Base 105 has a hole (not shown) formed therein that allows the base to fit around pole 98. Base 105 rests on bushing 109. The hole in base 105 is lightly oversized relative to the pole 98 so that base 105 can pivot about pole 98 as will be described below. It will be appreciated that base 107 is pivotally connected to pole 99 in the same way.

A support bracket 111 extends downwardly from the rear edge of base 105. A support bracket 113 also extends downwardly from base 107. A third elongated support bracket 115 extends downwardly from platform 93. The respective support brackets 111, 133 and 115 are substantially parallel when the belt assemblies are in a first or aligned start-up position as shown in FIGS. 1–3.

An elongated screw 117 engages holes (not shown) in the respective support brackets 111, 113 and 115. There is a hand-operated crank wheel 119 on one end of screw 117. It will be appreciated that screw 117 has oppositely threaded sections 117A and 117B. The oppositely threaded sections engage threaded holes in brackets 111 and 113. There are no threads in the hole in support bracket 115 so that screw 117 can turn freely in bracket 115.

It will be appreciated from the preceding description that rotation of screw 117 will cause bases 105 and 107 to pivot about the respective support poles 98 and 99. Since screw 117 has oppositely threaded sections, rotation of screw 117 via wheel 119 will cause bases 105 and 107, as well as the motor driven continuous belt assemblies 90 and 91, to pivot in opposite directions, as best seen in FIGS. 4 and 7. The relative angular positioning of the motor driven continuous belt assemblies 90 and 91 will now be described in greater detail.

For a more detailed description of the components of the motor driven continuous belt assemblies 90 and 91, and with particular reference to FIGS. 3 and 4, it will be seen that belt assembly 90 has a first roller drum 121 and a second roller drum 123. The exposed outer surfaces of the drums are covered by a shroud 125. The roller drums are held in alignment by side braces 127. There is an endless or continuous belt 137 of appropriate friction material tightly looped around roller drums 121 and 123. The endless or continuous belt 137 is constructed from a rubberized material or the like. A conventional motor 139 is operatively connected to roller drum 123.

Belt assembly 91 has a first roller drum 141 and a second roller drum 143 protected by shroud 145. The roller drums are held in alignment by side braces 147. A continuous belt 149 also constructed from appropriate material extends about roller drums 141 and 143. A conventional motor 151 is operatively connected to roller drum 143.

The motor driven continuous belt assemblies 90 and 91 just described cooperate to create one or more unique spirals of inlayed ribbons 15 by a method best illustrated in FIGS. 1, 4 and 7. As described above, the tube 3 within extruder die 65 receives an opposed pair of ribbons 15 of non-transparent material inlayed in channels 83 and 85. As will be understood from FIG. 7, the pair of ribbons 15 will be parallel within the die. As shown in FIGS. 1 and 2, the tube 3 is positioned between continuous belts 137 and 149. The respective motors 139 and 151 are synchronized to drive roller drums 123 and 143 at the same speed. When the extrusion process is begun, the belt assemblies 90 and 91 are in alignment or in the start-up position, as shown in FIGS. 1-3. The friction belts 137 and 149 frictionally engage the surface of tube 3 to urge it through die 65 in the direction of arrow A1, as shown in FIG. 7.

It will be understood that the tube 3 leaves extruder die 65 at a temperature of at least 350° F. At this temperature, tube 3 is malleable. As the extrusion process is proceeding, the user can adjust screw 117 via hand wheel 119. Screw 117 will cause belt assemblies 90 and 91 to pivot, as described above, to a second position shown in FIGS. 4 and 7. In this second position, the respective friction belts 137 and 149 are crossed or overlapped. The crossed or overlapped friction belts 90 and 91 provide opposite rotational forces, as shown by arrows A2 and A3 in FIG. 7. The opposite rotational forces A2 and A3 are generally transverse to the longitudinal extent of tube 3 and create rotational forces on tube 3, as illustrated by arrows A4 in FIG. 7. Such rotational forces A4 cause a malleable tube 3 to twist in the direction of rotational force A4 as it exits extruder die 65. Such twisting produces the spirally extending ribbons 15 of non-transparent material.

Since belt assemblies 90 and 91 can be positioned at any relative angle desired, the user can create one or more spirally extending ribbons having the desired number of turns or ribbon per liner measurement. For example, the greater the angle between the respective continuous friction belts 90, 91, the more twists in the direction of rotational force A4 the tube will make per liner foot as it leaves the die. Correspondingly, there will be more turns of ribbon 15 per linear foot of tube 3. In the preferred embodiment, ribbons 15 having one complete turn around tube 3 per linear foot of tube 3 are created. Other constructions are, of course possible.

As illustrated in FIG. 8 of the drawings, the one-piece plastic tube 21 may be manufactured with a plurality of thin-walled web sections. Specifically, the inner wall 25 of the tubular element 23 may have a plurality of integral thin-walled web sections 29, 29, 29 interconnected to one another at one end and interconnected to the inner peripherally extending wall 25 at an opposite end. In the FIG. 8 embodiment, there are three equally spaced thin-walled web sections 29, 29, 29; however, it will be understood that one or more of the integral web sections 29 may be shorter or constructed at a different angle than the other integral web sections 29, 29, as may be desired. In the FIG. 8 embodiment, it will also be noted that the three equally spaced thin-walled web sections 29, 29, 29 produce three separate compartments or passageways 31, 33 and 35 for receiving a plurality of discrete products. It will be appreciated that the three web sections 29, 29, 29 may be formed in spiral configuration when the tube 3 is twisted, in accordance with the disclosed method and apparatus. The integral spiral ribbon 37 is employed in the exterior of the tube 1 by following the above described method and apparatus of the present invention.

In the embodiment illustrated in FIG. 9 of the drawings, the one-piece tube multi-pack 41 has an integral thin-walled web section 49 which is connected to the inner peripherally extending wall 45 of the tubular element 43 at different relative locations throughout the tubular element 43. In the embodiment illustrated, the integral thin-walled web section 49 is shown as extending spirally throughout the tubular element 43. It will be appreciated that other curvilinear and other modified shapes of the integral thin-walled web section 49 may be provided throughout the tubular element 43, depending upon the shape and configuration that is desired. Like the other embodiments, the spirally extending integral thin-walled web section has greater flexibility than the tubular element 43; however, the spiral construction also affords lateral rigidity to the tubular element 43, particularly in those areas where the integral thin-walled web section 49 is interconnected to the tubular element 43. The transparent nature of the tubular element 43 and the integral thin-walled web section 49, together with the spiral shape of the integral thin-walled web section 49, produces an unusual and unique attractiveness and appearance for the one-piece tube multi-pack 41 when packaged with separate discrete products, such as multi-colored candy coated chocolates, that may be deposited in each of the compartments 51, 53. The integral inlayed spiral ribbon of material 37 is applied to the exterior of the tube by following the above described method and apparatus. It will be apparent that the spiral shape of the integral thin-walled web section 49 and the spiral ribbon of material inlayed on the exterior of the tube 41 are produced by twisting the tube in accordance with the aforementioned method and apparatus.

From the foregoing, it will now be appreciated that the present invention includes a new and improved method and apparatus.

In view of the above, it will be seen that the several objects and advantages of the present invention have been achieved and other advantageous results have been obtained. As various changes could be made in the above construction and method without department from the scope of the invention, it is intended that all matter contained in the above description or shown in the accompanying drawings shall be interpreted as illustrative and not in a limiting sense.

We claim:

1. The method of forming a one-piece thin-walled tube from flexible plastic material, comprising the steps of:

extruding an elongated thin-walled tubular element having inner and outer peripherally extending tubular walls, said outer peripherally extending wall having at least one channel formed therein;

simultaneously extruding at least one ribbon of material into said at least one channel formed in said outer peripherally extending wall, said ribbon of material being extruded with a predetermined greater volume than the at least one channel to assure complete filling of the at least one channel including along the outer peripherally extending wall of the thin-walled element while urging any excess volume inwardly within the tubular element; and twisting the tubular element while in a heated state in order to form at least one spirally extending ribbon extending along the outer peripheral wall of the tubular element.

2. The method of claim 1 and further including the step of simultaneously applying opposite rotational forces generally transverse to the longitudinal extent of the tubular element in order to produce said at least one spirally extending ribbon of material inlayed in said at least one channel provided in said tubular element.

3. The method of claim 2 wherein said opposite rotational forces are applied by angular offset opposite rotational forces that engage said tubular element.

4. The method of forming a one-piece thin-walled tube from flexible plastic material, comprising the steps of:

extruding an elongated thin-walled tubular element having inner and outer peripherally extending tubular walls, said tubular element having first and second spaced channels formed in said outer peripherally extending tubular wall;

simultaneously extruding first and second ribbons into said first and second channels, said ribbons of material being extruded with a predetermined greater volume than the first and second channels to assure complete filling of the first and second channels including along the outer peripherally extending wall of the thin-walled element while urging any excess volume inwardly within the tubular element; and twisting the tubular element while in a heated state to form spirally extending ribbons of non-transparent material along the outer peripherally extending wall of the tubular element.

5. The method of forming a thin-walled tube as defined in claim 4 wherein the tubular element is twisted by applying angularly opposed rotational forces generally transverse to the longitudinal extent of the tubular element at spaced distances along the length of the tubular element.

6. The method as defined in claim 5 wherein the twisting of the tubular element takes place shortly after extruding the tubular element.

7. The method as defined in claim 6 including at least one thin-walled web section extending spirally throughout the tubular element.

8. Apparatus for forming a one-piece thin-walled tube from flexible plastic material, comprising:

means for extruding an elongated thin-walled tubular element having inner and outer peripherally extending tubular walls, with the outer peripherally extending wall having at least one channel formed therein;

means for simultaneously extruding and inlaying at least one ribbon of material into said at least one channel formed in said outer peripherally extending wall said means for extruding and inlaying also supplying a predetermined greater volume of said ribbon of material than the at least one channel to assure complete filling of the at least one channel including along the outer peripherally extending wall of the thin-walled element while urging any excess volume inwardly within the tubular element; and means for twisting the tubular element with said at least one inlayed ribbon while in a heated state in order to form at least one spirally extending ribbon extending along the outer peripheral wall of the tubular element.

9. The apparatus of claim 8 and further including means for simultaneously applying opposite rotational forces generally transverse to the longitudinal extent of the tubular element in order to produce said at least one ribbon of material inlayed in said at least one channel provided in said tubular element.

10. The apparatus of claim 9 wherein said means for applying opposite rotational forces are applied by angular offset opposite rotational forces that engage said tubular element.

11. Apparatus for forming a one-piece thin-walled tube from flexible plastic material, comprising:

means for extruding an elongated thin-walled tubular element having inner and outer peripherally extending tubular walls, said tubular element having first and second spaced channels formed in said outer peripherally extending tubular wall;

means for simultaneously extruding and inlaying first and second ribbons into said first and second channels, said means for extruding and inlaying first and second ribbons extruding a predetermined greater volume of material for the at least one channel to assure complete filling of the at least one channel including along the outer peripherally extending wall of the thin-walled element while urging any excess volume inwardly within the tubular element; and means for twisting the tubular element while in a heated state to form spirally extending ribbons of non-transparent material along the outer peripherally extending wall of the tubular element.

12. The apparatus for forming a thin-walled tube as defined in claim 11 including means for twisting the tubular element by applying angularly opposed rotational forces generally transverse to the longitudinal extent of the tubular element at spaced distances along the length of the tubular element.

13. The apparatus as defined in claim 12 wherein the means for twisting of the tubular element takes place shortly after extruding the tubular element.

14. An apparatus for manufacturing a thin-walled transparent tube having at least one inlayed ribbon of material spirally extending the length of an outer wall of the tube, comprising:

a first extruder for extruding a thin-walled transparent tube, said first extruder having a die operatively associated therewith, with a first and second insert in said die for forming a first and second channel in an outer peripherally extending wall of said tube;

a second extruder in fluid communication with said die, said second extruder disposed to simultaneously extrude a ribbon of material through said first and second die insert and into said first and second channel formed in said outer peripherally extending wall, said ribbons of material being extruded from the second extruder with a predetermined greater volume than the first and second channel to assure complete filling of the first and second channel including along the outer peripherally extending wall of the thin-walled element while urging any excess volume inwardly within the tubular element;

first and second pivotally mounted motor driven continuously friction belts mounted in opposed angular relationship to each other for engaging the extruded tube therebetween to rotate said tube as it leaves the die;

an elongated screw between said first and second pivotally mounted motor driven continuous friction belts for adjusting the angular relationship between the two said friction belts; and wherein the angular relationship between the first and second pivotally mounted continuous friction belts can be adjusted by said screw so as to create adjustable rotational forces generally transverse to the longitudinal extent of the extruded tube in order to produce adjustable spirally extending ribbons of non-transparent material extending the length of the tube.

* * * * *